US007130972B2

(12) United States Patent
Yamamoto et al.

(10) Patent No.: US 7,130,972 B2
(45) Date of Patent: Oct. 31, 2006

(54) FUNCTION EXECUTION METHOD, FUNCTION EXECUTION APPARATUS, COMPUTER PROGRAM AND RECORDED MEDIUM

(75) Inventors: Akishige Yamamoto, Tokyo (JP); Taiichi Yuasa, Kyoto (JP)

(73) Assignee: Kansai Technology Licensing Organization Co., Ltd, Kyoto (JP)

( * ) Notice: Subject to any disclaimer, the term of this patent is extended or adjusted under 35 U.S.C. 154(b) by 464 days.

(21) Appl. No.: 10/628,133

(22) Filed: Jul. 25, 2003

(65) Prior Publication Data

US 2004/0088686 A1 May 6, 2004

Related U.S. Application Data

(63) Continuation of application No. PCT/JP02/02888, filed on Mar. 25, 2002.

(30) Foreign Application Priority Data

Mar. 26, 2001 (JP) .............................. 2001-088850

(51) Int. Cl.
*G06F 12/00* (2006.01)

(52) U.S. Cl. .................... 711/156; 711/132; 717/151

(58) Field of Classification Search ................ 711/1–6, 711/100–105, 111–115, 132, 153–154, 156, 711/165; 717/131–133, 140–141, 148, 151–161
See application file for complete search history.

(56) References Cited

U.S. PATENT DOCUMENTS 4,530,049 A * 7/1985 Zee ............................ 711/132

5,335,332 A * 8/1994 Christopher et al. .......... 700/90
5,530,870 A * 6/1996 De Bruler ................... 717/155
5,590,332 A * 12/1996 Baker ......................... 717/151
6,101,326 A * 8/2000 Mattson, Jr. ................. 717/151

FOREIGN PATENT DOCUMENTS

JP    S60-008944    1/1985
JP    04-245543     9/1992

OTHER PUBLICATIONS

Maeda, Sowa, "Proper Tail Recursion with shallow-bound Dynamically scoped Variables," Transactions of Information Processing Society of Japan, 2000, vol. 41, No. SIG4 (PR07), pp. 1 to 10.

(Continued)

*Primary Examiner*—Donald Sparks
*Assistant Examiner*—Hashem Farrokh
(74) *Attorney, Agent, or Firm*—Darby & Darby

(57) ABSTRACT

A function execution method, a function execution apparatus, a computer program and a recorded medium to execute a program of stacking, in a stack area of a memory, a function record area according to a format of an invoked function which is invoked by an invoking function including a process to invoke another function, invoking the invoked function, executing the invoked function and then discarding the stacked function record area, wherein a predetermined alternative function which substitutes the invoking function is executed when it is judged, from analysis of the invoking function by byte-code such as a JVM, that the invoking function is a trail-recursive invoking function, so that the alternative function as an invoking function invokes the invoked function utilizing the function record area utilized for executing the invoking function and the invoked function which has been invoked is executed.

4 Claims, 7 Drawing Sheets

OTHER PUBLICATIONS

Komiya, Yuasa, "Indefinite One-time Continuation," Transactions of Information Processing Society of Japan, 1996, vol. 37, No. 1, pp. 92-100.

Watanabe, Ito, "Iteractive Scheme Programs with call/cc and CPS Conversion," Information Processing Society of Japan, 1994, vol. 94, No. 79 (94-SYM-75), pp. 7-14.

Ishizaki et al., "Design, Implementation and Evaluation of Optimizations in a Java Just-In Time Compiler," Technical Report o The Institute of Electronics, Information and Communication Engineers, 1999, vol. 99, No. 252 (CPSY99-64) pp. 17 to 24.

Matsuoka, "Open JIT-Jiko Han'ei Keisan ni Motoduita doteki ni henk Kano na Java JIT Compiler," Computer Today, pp. 2-11, 1998, vol. 15, No. 6.

Concise English Explanation of Matsuoka, "Open JIT-Jiko Han'ei Keisan ni Motoduita doteki ni henk Kano na Java JIT Compiler," Computer Today, pp. 2-11, 1998, vol. 15, No. 6.

Eiji Kawai, et al., The Design and Implementation of High Performance and Portable Java Virtual Machine, IPSJ-SIG Note, vol. 8 No. 15, Feb. 26, 1998, pp. 25-30.

English Language translation of Japanese Patent Appln. No. 60-8944, p. 1, lower right column, line 20 to upper left column, line 1 and p. 3, upper left column, lines 8-19.

English Language translation of Kawai et al. "The Design and Implementation High Performance and Portable Java Virtual Machine", Research Report of Information Processing Society, vol. 98, No. 15, pp. 25-30 (Feb. 26, 1998), p. 25, left column.

English Translation of Ishizaki et al. "Design, Implementation and Evaluation of Optimizations In a Java Just-In-Time Complier", Research Report of the Institute of Electronics Information and Communication Engineers, vol. 99, No. 252, pp. 17-24 (Aug. 5, 1999), p. 20, left column.

\* cited by examiner

FUNCTION EXECUTION METHOD, FUNCTION EXECUTION APPARATUS, COMPUTER PROGRAM AND RECORDED MEDIUM

The present patent application is a continuation of International Application No. PCT/JP02/02888 filed Mar. 25, 2002. This International Application was not published in English.

TECHNICAL FIELD

The present invention relates to a function execution method for stacking, in a stack area of a memory, a function record area according to a format of an invoked function which is invoked by an invoking function including a process to invoke another function, invoking the invoked function utilizing the stacked function record area, executing the invoked function which has been invoked and then discarding the function record area; to a function execution apparatus to which the method is applied; to a computer program for realizing the apparatus; and to a recorded medium in which the computer program is recorded. More specifically, the present invention relates to a function execution method, a function execution apparatus, a computer program and a recorded medium for executing, with a JVM (Java Virtual Machine), functions written in language such as Java.

BACKGROUND ART

Function execution methods that execute programs containing multiple functions composed of multiple instructions written in language such as Java are utilized recently in many applications and such language such as Java is generally executed in an area of a memory of a JVM after being compiled into byte-code of the JVM.

FIG. 1 is a conceptual diagram showing function record areas in which functions necessary to execute a program are recorded.

A program is executed generally as nested invocation of functions (methods). That is, as shown in FIGS. 1(a), (b) and (c), regarding functions necessary to execute a program, an invoked function to be executed is invoked by an invoking function in execution, a new function record area according to a format of the invoked function is stacked and secured on a function record area (frame) of the invoking function in execution that are secured in a stack area of a memory, the invoked function which has been invoked is executed utilizing the secured function record area and the stacked function record area which has become unnecessary is discarded after completion of execution of the invoked function.

The function record area stacked on the top, in which the function in execution is recorded, is called a top-frame. In FIG. 1(a) wherein a function F is in execution, the function record area of the function F is the top-frame.

When the function F as an invoking function invokes a function G which is an invoked function, a function record area to execute the function G is stacked in the stack area to be the top-frame as shown in FIG. 1(b). After completion of execution of the function G, execution results of the function G are transferred to the function F and the corresponding function record area is discarded, so that the state becomes as in FIG. 1(a) that is the state before invocation.

It should be noted in FIG. 1(b) that, when the function G as an invoking function further invokes another function H which is an invoked function, a function record area to execute the function H is stacked in the stack area to be the top-frame as shown in FIG. 1(c). After completion of execution of the function H, execution results of the function H are transferred to the function G and the corresponding function record area is discarded, so that the state becomes as in FIG. 1(b) that is the state before invocation.

Here, when the execution results of the function H as an invoked function invoked by the function G which is an invoking function are transferred to the function F as execution results of the function G, the invocation of the function H is called tail-recursive invocation. In tail-recursive invocation, the function record areas of the functions H and G are discarded one after another, after completion of execution of the function H.

However, to stack many function record areas in the stack area may cause the stack area to overflow and a problem may arise in some cases in execution of a program.

Moreover, a problem of decrease in total execution speed may arise because of the processing load required for stacking and discarding function record areas.

The present invention has been made in consideration of these situations, and it is a main object thereof to provide a function execution method which can reduce the possibility of occurrence of a problem in execution of a program due to function record areas overflowing a stack area and reduce the processing load required for stacking and discarding areas to improve total execution speed by not stacking a new function record area but utilizing a function record area, in which an invoking function is recorded, as a function record area, in which an invoked function is recorded, when it is judged that invocation by an invoking function is tail-recursive invocation; a function execution apparatus to which the method is applied; a computer program for realizing the apparatus; and a recorded medium in which the computer program is recorded.

Another object of the present invention is to provide a function execution method, and the like, that does not require any special attention in making source-codes using language such as Java and that does not require additional special instructions for compilers which convert source-codes to a function of execution format such as byte-code, wherein in execution of an invoking function of execution format such as byte-code of a JVM, the invoking function to be executed is substituted by an alternative function prepared beforehand and the alternative function which has substituted is executed, so as to realize the above-mentioned process of re-utilizing the function record area.

Further object of the present invention is to provide a function execution method, and the like, that can decrease total processing load and make the function record area appropriate by utilizing the secured function record area as it is when the invoking function is the same as the invoked function, and changing the secured function record area according to a format of the invoked function when the invoking function is different from the invoked function.

SUMMARY OF THE INVENTION

A function execution method of the first invention comprises steps of stacking, in a stack area of a memory, a function record area according to a format of an invoked function which is invoked by executing an invoking function including a process to invoke another function; invoking the invoked function utilizing the stacked function record area; executing the invoked function which has been invoked; and then discarding the stacked function record area, wherein an execution format of a first invoking function, which is obtained by compiling source-codes, to be executed in the function record area is analyzed and, when it is judged from the analysis that execution results of an invoked function to be invoked by the first invoking function become execution results of the invoking function, a second invoking function, which is different from the first invoking function and includes a process of utilizing the function record area to execute the invoking function as an area to invoke the invoked function, is executed as an alternative function to the first invoking function.

With the function execution method of the first invention, when it is judged that invocation by a first invoking function is tail-recursive invocation in which execution results of the invoked function become execution results of the invoking function a second invoking function, which is provided newly and includes a process of re-utilizing a used function record area as a record area of an invoked function, is executed as an alternative function to the first invoking function. As a result, the number of function record areas stacked in the stack area is reduced, the possibility of occurrence of a problem in execution of a program due to function record areas overflowing the stack area is reduced and the processing load required for stacking and discarding function record areas is reduced, so that total execution speed can be improved. Moreover, since the above-described process to execute the second invoking function as an alternative function to the first invoking function is performed by analyzing the first invoking function of execution format such as byte-code obtained by compiling source-codes written in language such as Java, it is unnecessary to pay any special attention in making source-codes and no additional special instruction is required for compilers which convert the source-codes.

Furthermore, since the function record area secured for the invoking function is changed according to the format of the invoked function when the invoking function is different from the invoked function, it is possible to execute the invoked function in the re-utilized function record area without problem; and when the invoking function is the same as the invoked function, it is possible to improve total processing speed by re-utilizing the function record area without changing the format so as to omit a process required for changing the format.

A function execution apparatus of the second invention, which stacks, in a stack area of a memory, a function record area according to a format of an invoked function which is invoked by executing an invoking function including a process to invoke another function, invokes the invoked function utilizing the stacked function record area, executes the invoked function which has been invoked and then discards the stacked function record area, comprises means for analyzing an execution format of a first invoking function, which is obtained by compiling source-codes, to be executed in the function record area and means for executing a second invoking function, which is different from the first invoking function and includes a process of utilizing the function record area to execute the invoking function as an area to invoke the invoked function, as an alternative function to the first invoking function when it is judged from the analysis that execution results of an invoked function to be invoked by the first invoking function become execution results of the invoking function.

With the function execution apparatus of the second invention, when it is judged that invocation by a first invoking function is tail-recursive invocation in which execution results of the invoked function become execution results of the invoking function, a second invoking function, which is provided newly and includes a process of re-utilizing a used function record area as a record area of an invoked function, is executed as an alternative function to the first invoking function. As a result, the number of function record areas stacked in the stack area is reduced, the possibility of occurrence of a problem in execution of a program due to function record areas overflowing the stack area is reduced and the processing load required for stacking and discarding function record areas is reduced, so that total execution speed can be improved. Moreover, since the above-described process to execute the second invoking function as an alternative function to the first invoking function is performed by analyzing the first invoking function of execution format such as byte-code obtained by compiling source-codes written in language such as Java, it is unnecessary to pay any special attention in making source-codes and no additional special instruction is required for compilers which convert the source-codes.

Furthermore, since the function record area secured for the invoking function is changed according to the format of the invoked function when the invoking function is different from the invoked function, it is possible to execute the invoked function in the re-utilized function record area without problem; and when the invoking function is the same as the invoked function, it is possible to improve total processing speed by re-utilizing the function record area without changing the format so as to omit a process required for changing the format.

A computer program of the third invention that causes a computer to stack, in a stack area of a memory, a function record area according to a format of an invoked function which is invoked by executing an invoking function including a process to invoke another function, to invoke the invoked function utilizing the stacked function record area, to execute the invoked function which has been invoked and then to discard the stacked function record area, comprises a procedure for causing the computer to analyze an execution format of a first invoking function, which is obtained by compiling source-codes, to be executed in the function record area and a procedure for causing the computer to execute a second invoking function, which is different from the first invoking function and includes a process of utilizing the function record area to execute the invoking function as an area to invoke the invoked function, as an alternative function to the first invoking function when it is judged from the analysis that execution results of an invoked function to be invoked by the first invoking function become execution results of the invoking function.

When the computer program of the third invention is executed by a JVM consisting of a processing apparatus such as a portable phone and a personal computer, the JVM can operate as a function execution apparatus. When it is judged that invocation by a first invoking function is tail-recursive invocation in which execution results of the invoked function become execution results of the invoking function, a second invoking function, which is provided newly and includes a process of re-utilizing a used function record area as a record area of an invoked function, is executed as an alternative function to the first invoking function. As a result, the number of function record areas stacked in the stack area is reduced, the possibility of occurrence of a problem in execution of a program due to function record areas overflowing the stack area is reduced and the processing load required for stacking and discarding function record areas is reduced, so that total execution speed can be improved. Moreover, since the above-described process to execute the second invoking function as an alternative function to the first invoking function is performed by analyzing the first invoking function of execution format such as byte-code obtained by compiling source-codes written in language such as Java, it is unnecessary to pay any special attention in making source-codes and no additional special instruction is required for compilers which convert the source-codes.

Furthermore, since the function record area secured for the invoking function is changed according to the format of the invoked function when the invoking function is different from the invoked function, it is possible to execute the invoked function in the re-utilized function record area without problem; and when the invoking function is the same as the invoked function, it is possible to improve total processing speed by re-utilizing the function record area without changing the format so as to omit a process required for changing the format.

Recorded in a recorded medium of the fourth invention readable by a computer is a computer program that causes a computer to stack, in a stack area of a memory, a function record area according to a format of an invoked function which is invoked by executing an invoking function including a process to invoke another function, to invoke the invoked function utilizing the stacked function record area, to execute the invoked function which has been invoked and then to discard the stacked function record area. The computer program comprises a procedure for causing the computer to analyze an execution format of a first invoking function, which is obtained by compiling source-codes, to be executed in the function record area and a procedure for causing the computer to execute a second invoking function, which is different from the first invoking function and includes a process of utilizing the function record area to execute the invoking function as an area to invoke the invoked function, as an alternative function to the first invoking function when it is judged from the analysis that execution results of an invoked function to be invoked by the first invoking function become execution results of the invoking function.

According to the recorded medium of the fourth invention that is readable by a computer, when the recorded computer program is executed by a JVM consisting of a processing apparatus such as a portable phone and a personal computer, the JVM can operate as a function execution apparatus. When it is judged that invocation by a first invoking function is tail-recursive invocation in which execution results of the invoked function become execution results of the invoking function, a second invoking function, which is provided newly and includes a process of re-utilizing a used function record area as a record area of an invoked function, is executed as an alternative function to the first invoking function. As a result, the number of function record areas stacked in the stack area is reduced, the possibility of occurrence of a problem in execution of a program due to function record areas overflowing the stack area is reduced and the processing load required for stacking and discarding function record areas is reduced, so that total execution speed can be improved. Moreover, since the above-described process to execute the second invoking function as an alternative function to the first invoking function is performed by analyzing the first invoking function of execution format such as byte-code obtained by compiling source-codes written in language such as Java, it is unnecessary to pay any special attention in making source-codes and no additional special instruction is required for compilers which convert the source-codes.

Furthermore, since the function record area secured for the invoking function is changed according to the format of the invoked function when the invoking function is different from the invoked function, it is possible to execute the invoked function in the re-utilized function record area without problem; and when the invoking function is the same as the invoked function, it is possible to improve total processing speed by re-utilizing the function record area without changing the format so as to omit a process required for changing the format.

DETAILED DESCRIPTION

Following is the detailed description of an embodiment of the invention according to the figures.

Figure 1:
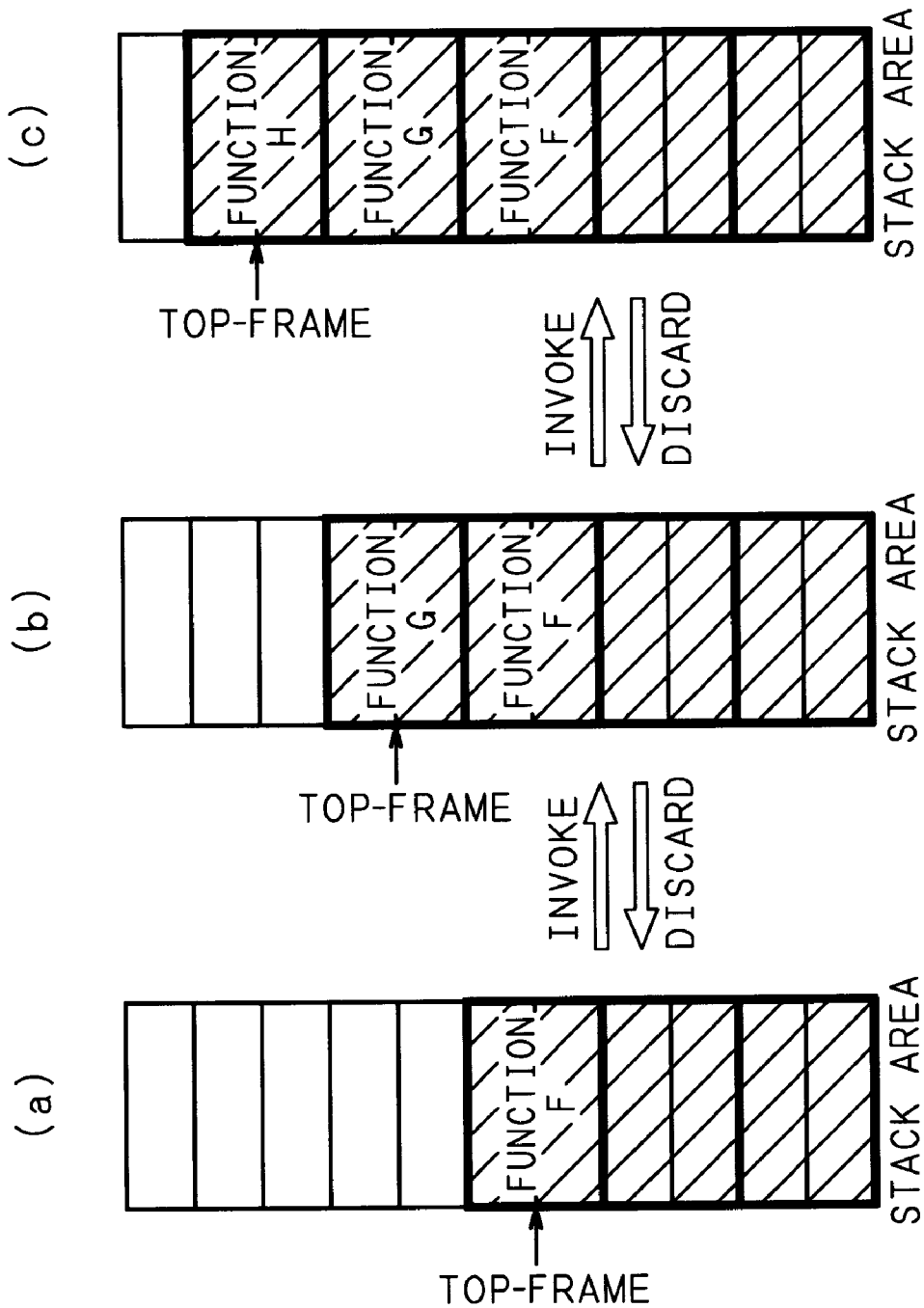
FIG. 1 is a conceptual diagram showing function record areas in which functions necessary to execute a program are recorded.
Figure 2:
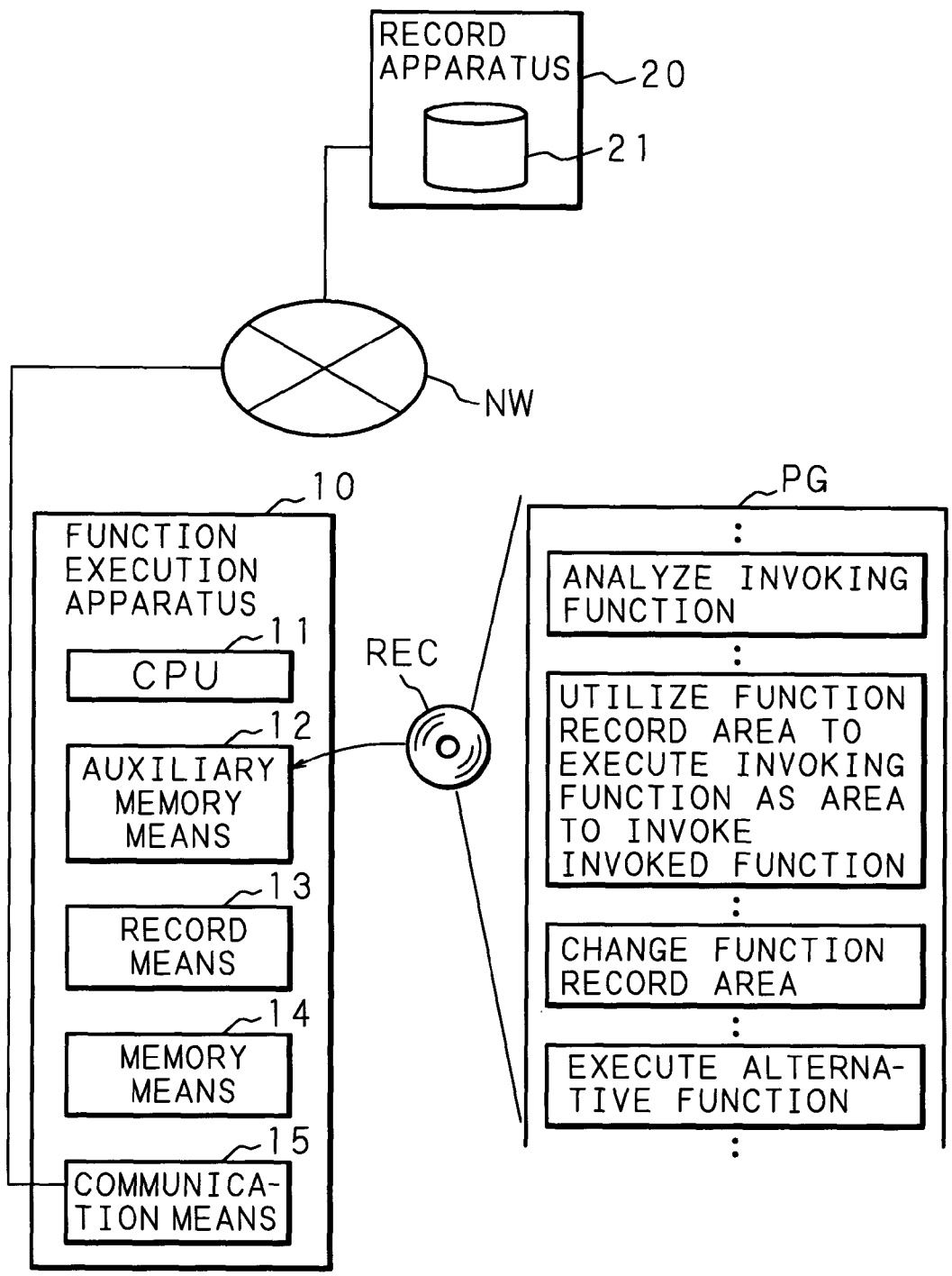
FIG. 2 is a block diagram showing a function execution apparatus of the invention.

FIG. 2 is a block diagram showing a function execution apparatus of the invention.

A reference numeral 10 in the figure indicates a function execution apparatus of the present invention consisting of a processing apparatus such as a portable phone and a personal computer. The function execution apparatus 10 is equipped with auxiliary memory means 12 that reads information such as a computer program PG and data from a recorded medium REC such as a CD-ROM and a memory card in which information such as a computer program PG and data for the function execution apparatus of the present invention is recorded, record means 13 such as a hard disc which records information such as a computer program PG and data read by the auxiliary memory means 12, and memory means 14 which records various information temporarily.

The processing apparatus (computer) operates as the function execution apparatus 10 of the present invention through reading information such as a computer program PG and data from the record means 13, storing the information in the memory means 14 and executing the information by a CPU 11.

The function execution apparatus 10 is additionally equipped with communication means 15 such as a modem, a TA (Terminal Adapter) and an antenna, so that the function execution apparatus 10 may be connected through the communication means 15 with a communication network NW such as the Internet to obtain and execute information such as a computer program PG of the invention and data recorded in a recorded medium 21 provided in a record apparatus 20 such as a Web-server computer connected to the communication network NW.

The content of processes of the function execution method of the invention will be explained.

The function execution method of the present invention is applied to a method for executing a program that contains multiple functions composed of multiple instructions obtained through compiling source-codes written in language such as Java into execution format such as byte-code of a JVM using common compilers, and a basic way of the function execution method is to stack a function record area according to a format, such as the number of arguments and the size of local variable area, of the function to be executed in a stack area in the memory means 14 and to execute a function by invoking the function into the stacked function record area.

Figure 3:
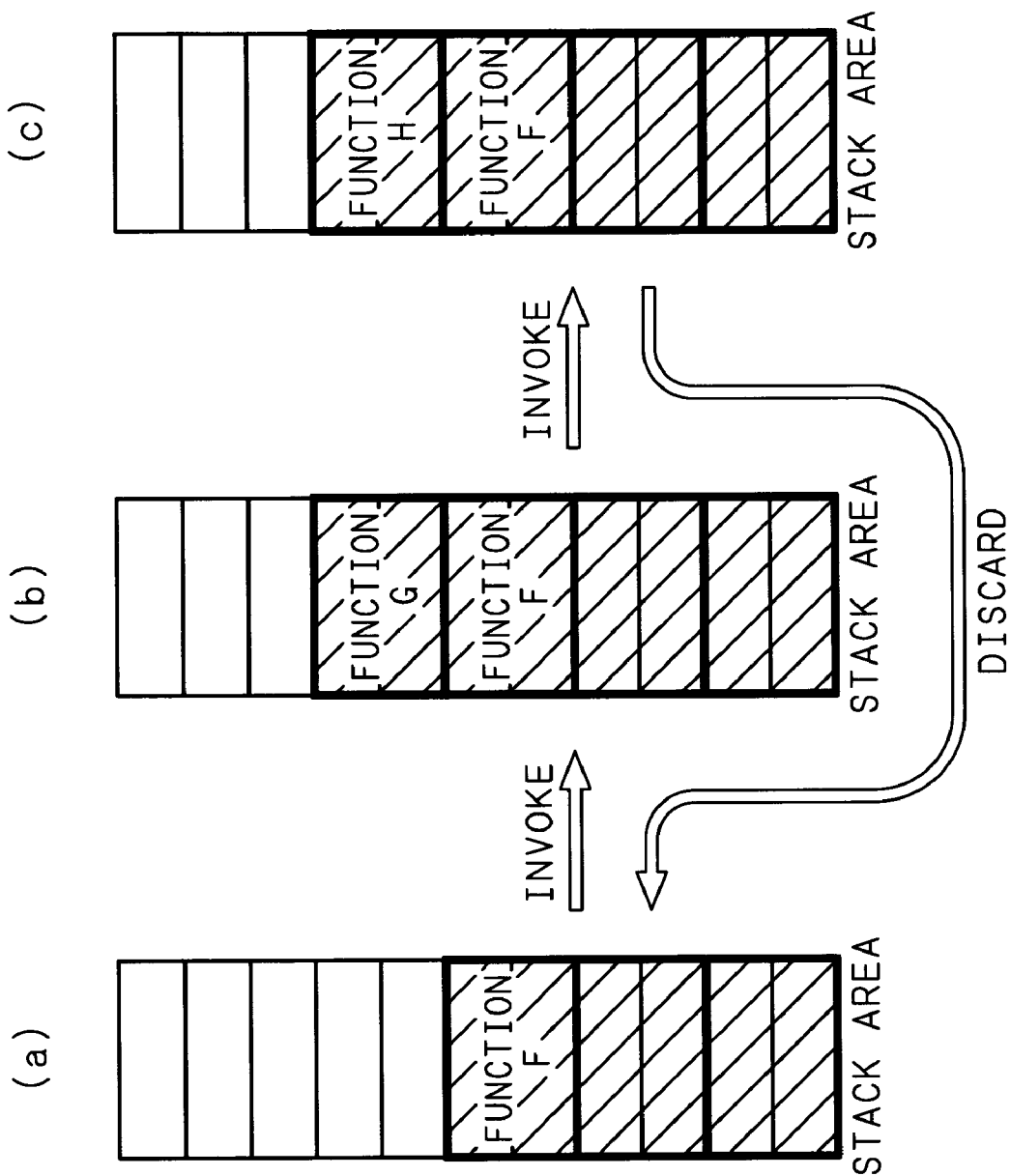
FIG. 3 is an illustration diagram conceptually showing a function execution method of the invention.

FIG. 3 is an illustration diagram conceptually showing the function execution method of the invention.

FIG. 3(*a*) shows a state where a function F of execution format is executed in a function record area secured in the stack function area.

When the function F as an invoking function to be executed in the function record area invokes a function G of execution format which is an invoked function invoked by the function F, a new function record area to invoke the function G is stacked on the function record area of the function F as shown in FIG. 3(*b*) and the function G is invoked and executed utilizing the stacked function record area.

Furthermore, when the function G as an invoking function invokes a function H of execution format which is an invoked function invoked by the function G and the invocation is tail-recursive wherein execution results of the function H become execution results of the function G, the function record area in which the function G is recorded is utilized as a function record area to invoke the function H, without stacking a new function record area for the function H as shown in FIG. 3(*c*).

Then, the execution results of the function H are transferred to the function F and the function record area used to execute the function H is discarded.

Figure 4:
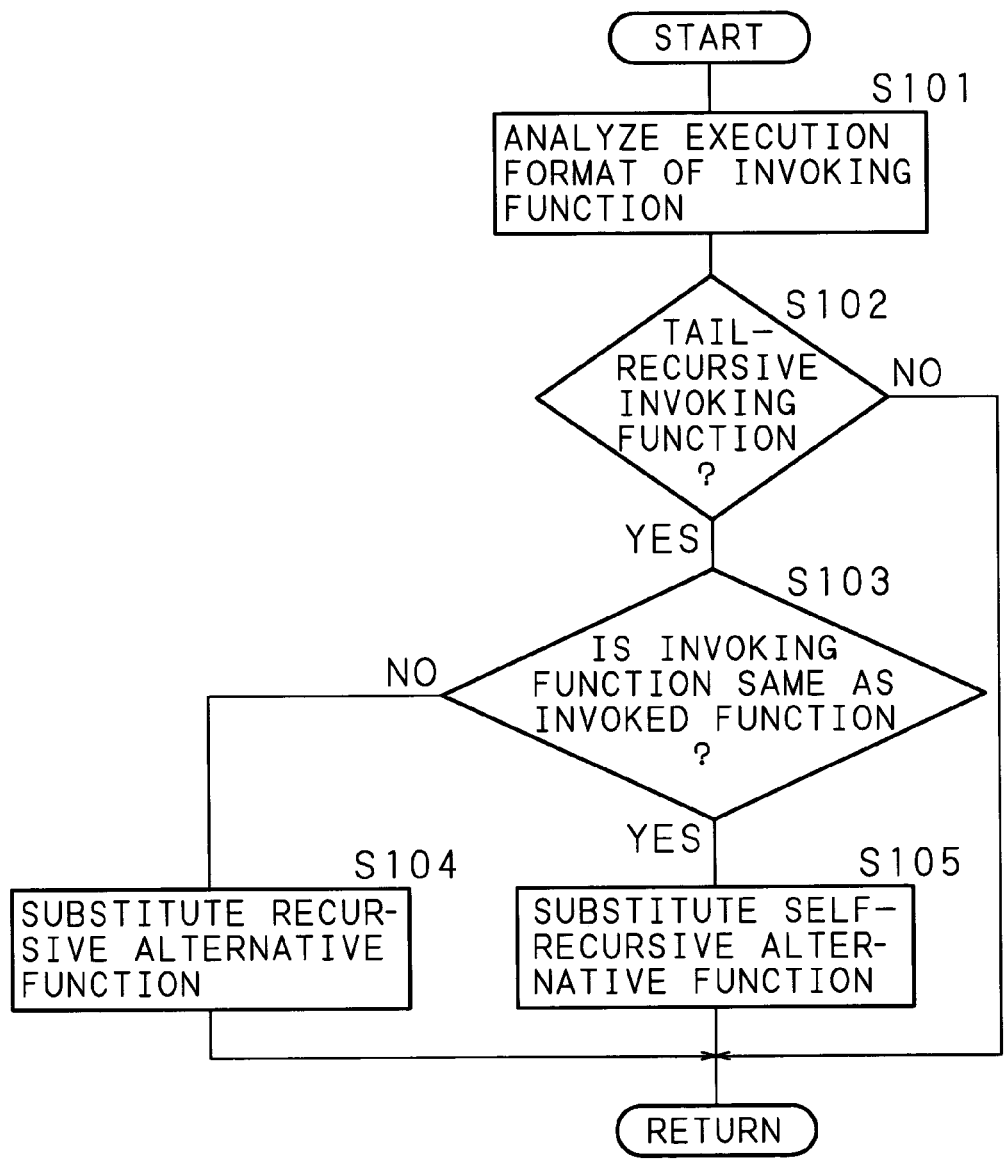
FIG. 4 is a flowchart showing an analysis process of the function execution method of the invention.

An analysis process of the function execution method of the present invention is explained next using the flowchart shown in FIG. 4.

In analysis of functions of byte-code such as a JVM, when a function to be invoked is an invoking function containing an instruction for invoking an invoked function, such as 'invokestatic', 'invokevirtual', 'invokespecial' and 'invokeinterface', the execution format of the corresponding invoking function is analyzed (S101). When it is judged from the analysis that the invoking function is a tail-recursive invoking function which satisfies a condition that execution results of the invoked function become execution results of the invoking function (S102: Y), it is further determined whether the invoking function is the same as the invoked function or not (S103).

A concrete example in Java of the criterion of judgment in the step S102 that the invocation is tail-recursive is that there is a return instruction after any number of instructions that exclusively change the program counter, such as 'nop' and 'goto' instructions, that immediately follow the instruction to invoke the invoked function; the type of a return value of the invoked function coincides with the type of the return instruction such as 'ireturn', 'lreturn', 'freturn', 'dreturn', 'areturn' and 'return'; no exception handler is set between the instruction to invoke the invoked function and the return instruction; and the like.

When it is judged in the step S103 that the invoking function is different from the invoked function (S103: N), the corresponding invoking function (first invoking function) is substituted by a recursive alternative function (second invoking function) wherein the instruction to invoke the invoked function is substituted by an alternative instruction prepared beforehand (S104).

When it is judged that the invoking function is the same as the invoked function (S103: Y), the corresponding invoking function (first invoking function) is substituted by a self-recursive alternative function (second invoking function) wherein the instruction to invoke the invoked function which is the same as the invoking function is substituted by an alternative instruction prepared beforehand (S105).

It should be noted that, when multiple instructions to be substituted are contained, the function is substituted by a function wherein all corresponding instructions are substituted.

When it is judged in the step S102 that the invoking function is not tail-recursive (S102: N), the processes of steps S103 through S105 are not performed.

The following are the new instructions to be included in functions prepared as recursive alternative functions shown in the step S104 and self-recursive alternative functions shown in the step S105 to be used as alternative functions of invoking functions.

That is, prepared as a recursive alternative function of an invoking function including an invoking instruction such as
- 'invokestatic',
- 'invokevirtual',
- 'invokespecial' and
- 'invokeinterface' is an alternative instruction such as
- 'tailinvokestatic',
- 'tailinvokevirtual',
- 'tailinvokespecial' and
- 'tailinvokeinterface', and a recursive alternative function including the prepared alternative instruction is used.

Moreover, prepared as a self-recursive alternative function is an alternative instruction such as
- 'selftailinvokestatic',
- 'selftailinvokevirtual',
- 'sefltailinvokespecial' and
- 'selftailinvokeinterface', and a self-recursive alternative function including the prepared alternative instruction is used.

Functions that include those instructions are only substituted in the analysis process and they are actually executed in the execution process to execute the substituted functions. Following is the explanation for the execution process to explain the functions.

Figure 5:
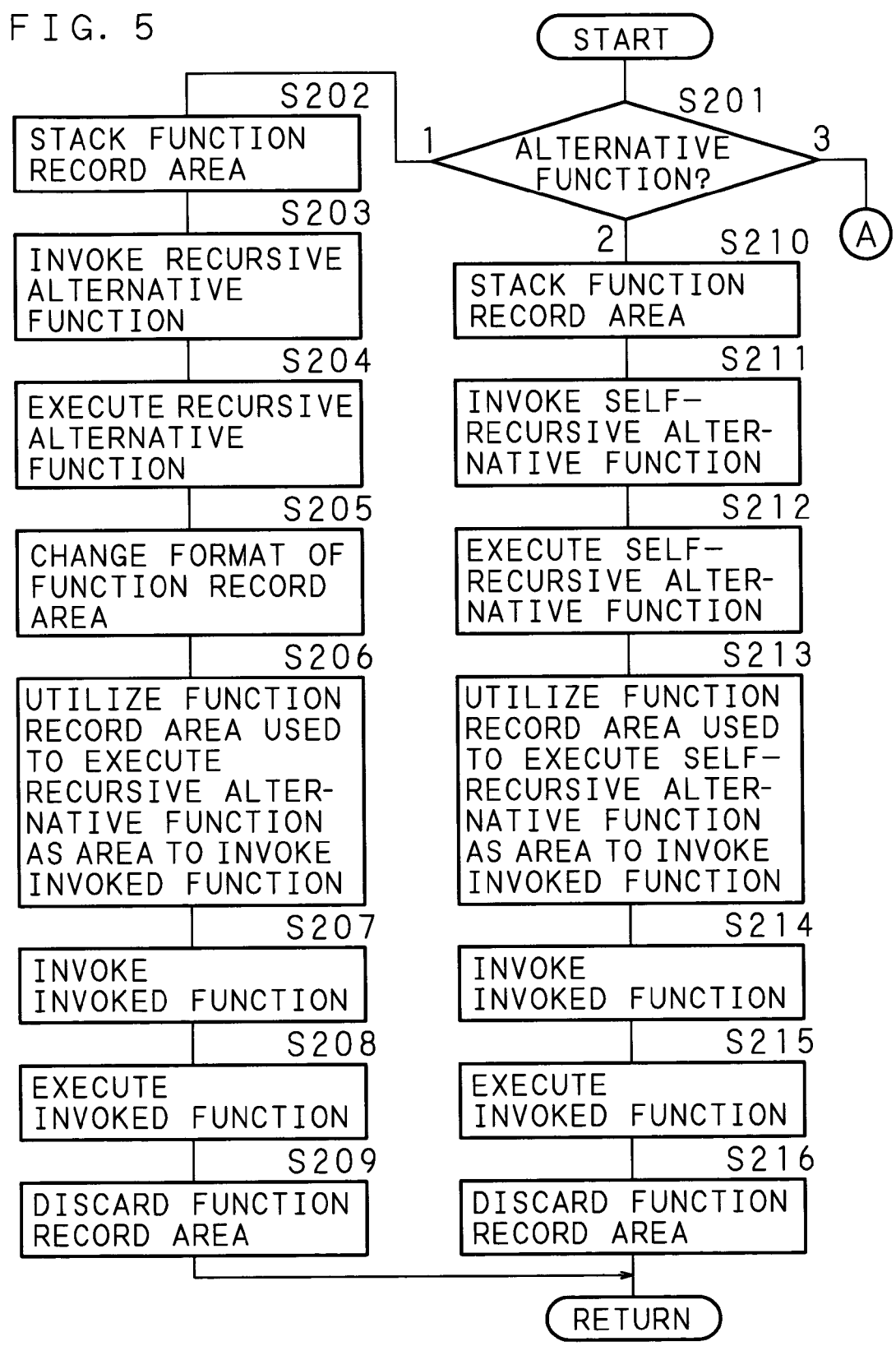
FIG. 5 is a flowchart showing an execution process of the function execution method of the invention.
Figure 6:
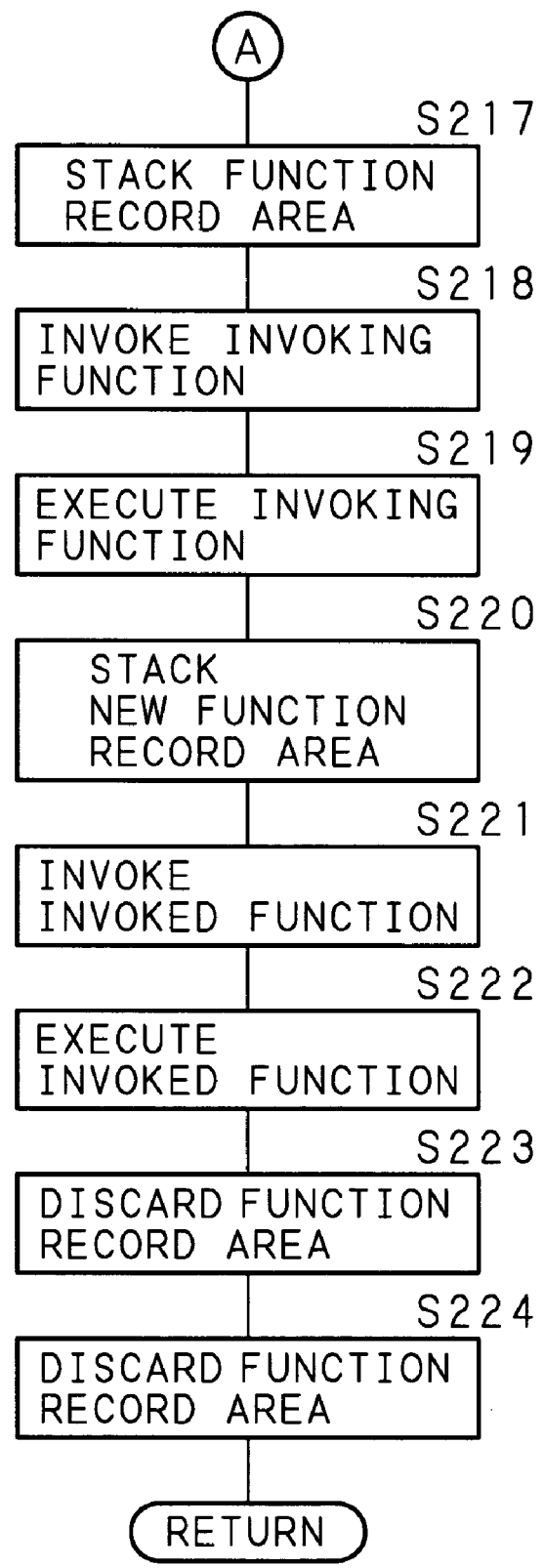
FIG. 6 is a flowchart showing the execution process of the function execution method of the invention.

FIG. 5 and FIG. 6 are flowcharts showing the execution process of the function execution method of the present invention.

In execution of a function that is substituted as the need arises in the analysis process of the execution format, it is first determined whether an invoking function to be executed is an alternative function, i.e. a recursive alternative function or a self-recursive alternative function, or not (S201). When it is judged that the function is a recursive alternative function (S201: 1), a function record area according to the format of the recursive alternative function (second invoking function) is stacked (S202), the recursive alternative function is invoked utilizing the stacked function record area (S203) and the recursive alternative function is executed in the function record area (S204) stacked in the step S202.

Then, when a recursive alternative function (second invoking function) executed as an invoking function (first invoking function) invokes an invoked function through a process by alternative instructions such as 'tailinvokestatic' included in the alternative function, the function record area used for execution of the recursive alternative function is changed according to the format of the invoked function without stacking a new function record area (S205), the function record area the format of which has been changed is utilized as an area to invoke the invoked function (S206), an invoked function is invoked (S207), the invoked function which has been invoked is executed (S208) and the function record area utilized for execution of the invoked function is discarded (S209) after the execution of the invoked function.

When it is judged in the step S201 that the function is a self-recursive alternative function (S201: 2), the function record area according to the format of the self-recursive alternative function (second invoking function) is stacked (S210), the self-recursive alternative function is invoked utilizing the stacked function record area (S211) and the self-recursive alternative function is executed in the function record area (S212) stacked in the step S210.

Then, when the self-recursive alternative function (second invoking function) executed as an invoking function (first invoking function) invokes an invoked function through a process by alternative instructions such as 'selftailinvokestatic' included in the self-recursive alternative function, the function record area used for execution of the self-recursive alternative function is utilized as an area to invoke the invoked function without stacking a new function record area (S213), an invoked function is invoked (S214), the invoked function which has been invoked is executed (S215) and the function record area utilized for execution of the invoked function is discarded (S216) after the execution of the invoked function.

When it is judged in the step S201 that the function is not an alternative function (S201: 3), the function record area according to the format of the invoking function is stacked (S217), the invoking function is invoked utilizing the stacked function record area (S218) and the invoking function is executed in the function record area (S219) stacked in the step S217.

Then, when the invoking function invokes an invoked function, a new function record area according to the format of the invoked function is stacked (S220), the stacked function record area is utilized to invoke the invoked function (S221), the invoked function is executed in the function record area (S222) stacked in the step S220. After the execution of the invoked function, the function record area utilized for the execution of the invoked function is discarded (S223) and the function record area utilized to execute the invoking function is also discarded through a process for the invoking function after the execution of the invoked function (S224).

The results of processing speed comparison between the conventional function execution method and the function execution method of the present invention will be explained according to the graph shown in FIG. 7.

Figure 7:
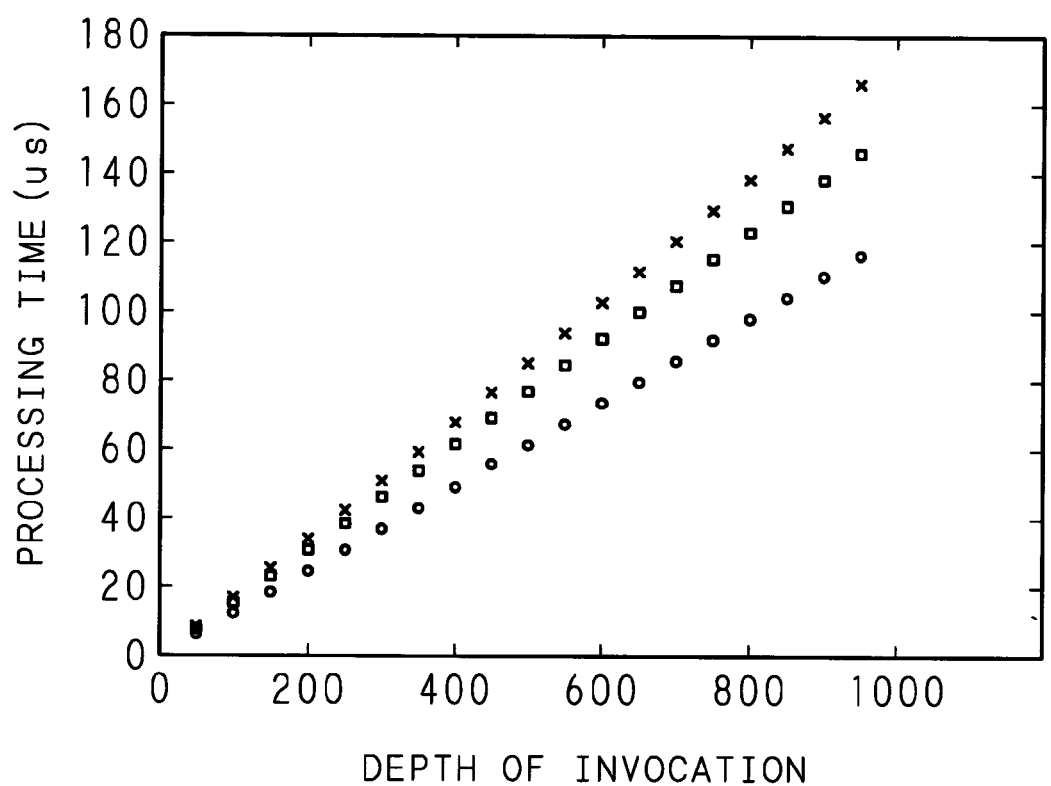
FIG. 7 is a graph showing the processing speed of a conventional function execution method and of the function execution method of the invention.

FIG. 7, in which the horizontal axis indicates the depth of invocation of a tail-recursive invoking function and the vertical axis indicates the processing time measured in microseconds (us), show the relation between them. The symbol x denotes the relation between processing time and depth of invocation in a conventional function execution method wherein a function record area is stacked each time an invoking function is invoked. The box-shaped symbol denotes the relation between processing time and depth of invocation in the function execution method of the present invention wherein a function record area is re-utilized when the invoking function is tail-recursive invocation. The circle-shaped symbol denotes the relation between processing time and depth of invocation in a case where a self-tail-recursive invoking function, in which the invoking function is the same as the invoked function, is handled.

As shown in FIG. 7, the processing time of the function execution method of the present invention is shorter than the conventional function execution method, and it is especially eminent in the self-tail-recursive invoking function.

Packaging technique of a JVM called JIT (Just In Time Compiler) may be used in an embodiment of the present invention. The JIT technique makes it possible to improve execution processing speed by converting byte-code of JVM into machine code and executing the code with the CPU 11.

In the embodiment described above, an alternative function is utilized when the invoking function is tail-recursive or self-tail-recursive invocation. However, the present invention is not limited to this and it is possible to perform recursive judgment at each function execution time and to perform tail-recursive processing when it is judged that the function is tail-recursive.

INDUSTRIAL APPLICABILITY

As described above in detail, with the instruction execution method, the instruction execution apparatus, the computer program and the recorded medium according to the present invention, a program which is written in language such as Java and contains multiple functions could be executed by a JVM consisting of a processing apparatus such as a portable phone and a personal computer. In this case, an execution format of a first invoking function including a process to invoke another function into a stack area of a memory is analyzed and, when it is judged that invocation by the first invoking function is trail-recursive invocation in which execution results of the invoked function become execution results of the invoking function, a second invoking function, which is a function prepared newly and includes a process of re-utilizing the function record area of the invoking function as a record area of the invoked function, is executed as an alternative function to the first invoking function so as to reduce the number of function record areas stacked in the stack area. Consequently, the possibility of occurrence of a problem in execution of a program due to function record areas overflowing the stack area is reduced and the processing load required for stacking and discarding function record areas is reduced, so that total execution speed can be improved.

Moreover, the above-described process to execute the second invoking function as an alternative function to the first invoking function is performed by analyzing the first invoking function of execution format such as byte-code which is obtained by compiling source-codes written in language such as Java. Consequently, it is unnecessary to pay any special attention in making source-codes and no additional special instruction is required for compilers which convert the source-codes.

Furthermore, with the invention wherein the function record area secured for the invoking function is changed according to the format of the invoked function when the invoking function is different from the invoked function, it is possible to execute the invoked function in the re-utilized function record area without problem; and when the invoking function is the same as the invoked function, it is possible to improve total processing speed by re-utilizing the function record area without changing the format so as to omit a process required for changing the format.

The invention claimed is:

1. A function execution method comprising steps of:
   stacking, in a stack area of a memory, a function record area according to a format of a first function which is invoked by executing a first invoking function, wherein the first invoking function includes a process to invoke at least one other function;
   invoking the first function utilizing the stacked function record area;
   executing the first function which has been invoked;
   discarding the stacked function record area;
   compiling source-codes of the first invoking function into an execution format;
   analyzing the execution format of the first invoking function obtained from compiled source-codes;
   executing the first invoking function in the function record area;
   judging if the first invoking function is tail recursive by determining if an execution result of the first function is an execution result of the first invoking function; and
   if the first invoking function is judged to be tail recursive, then executing a second invoking function as an alternative function;
   wherein the second invoking function, which is different from the first invoking function, includes utilizing the function record area to invoke the first function.

2. A function execution apparatus, which stacks, in a stack area of a memory, a function record area according to a format of a first function which is invoked by executing a first invoking function wherein the first invoking function includes a process to invoke at least one other function, invokes the first function utilizing the stacked function record area, executes the first function which has been invoked and then discards the stacked function record area, comprising:
   means for analyzing an execution format of the first invoking function, obtained from compiled source-codes, to be executed in the function record area; and
   means for executing a second invoking function, which is different from the first invoking function, that includes utilizing the function record area to invoke the first function, as an alternative function if the first invoking function is analyzed to be tail recursive.

3. A function execution apparatus, which stacks, in a stack area of a memory, a function record area according to a format of a first function which is invoked by executing a first invoking function wherein the first invoking function includes a process to invoke at least one other function, invokes the first function utilizing the stacked function record area, executes the first function which has been invoked and then discards the stacked function record area, comprising:
   a controller operable to perform:
   analysis of an execution format of the first invoking function obtained from compiled source-codes, to be executed in the function record area; and
   execution of a second invoking function, which is different from the first invoking function, that includes utilizing the function record area to invoke the first function, as an alternative function if the first invoking function is analyzed to be tail recursive.

4. A recorded medium readable by a computer, in which a computer program that causes a computer to stack, in a stack area of a memory, a function record area according to a format of a first function which is invoked by executing a first invoking function, wherein the first invoking function includes a process to invoke at least one other function, invokes the first function utilizing the stacked function record area, executes the first function which has been invoked and then discards the stacked function record area is recorded, the computer program comprising:
   a procedure for causing the computer to analyze an execution format of the first invoking function obtained from compiled source-codes, to be executed in the function record area; and
   a procedure for causing the computer to execute a second invoking function, which is different from the first invoking function, that includes utilizing the function record area to invoke the first function, as an alternative function if the first invoking function is analyzed to be tail recursive.

* * * * *